(No Model.) 2 Sheets—Sheet 1.

J. LAUDE.
SEED PLANTER.

No. 325,844. Patented Sept. 8, 1885.

WITNESSES:
Otto Berger
C. Sedgwick

INVENTOR:
J. Laude
BY Munn & Co.
ATTORNEYS.

N. PETERS, Photo-Lithographer, Washington, D. C.

(No Model.) 2 Sheets—Sheet 2.
J. LAUDE.
SEED PLANTER.
No. 325,844. Patented Sept. 8, 1885.
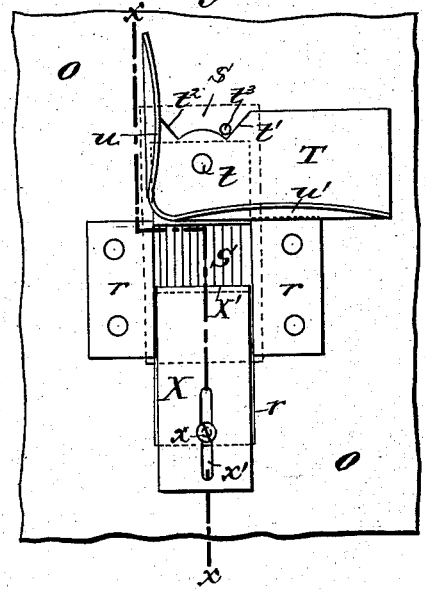
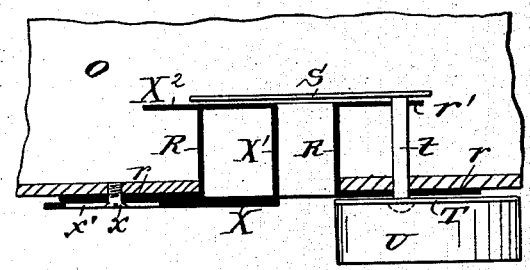
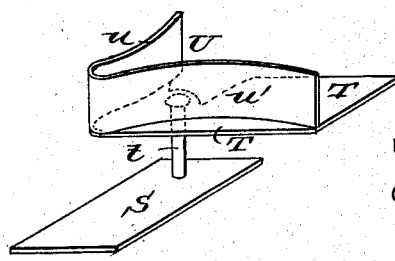
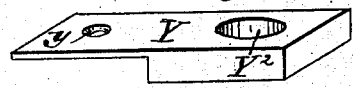
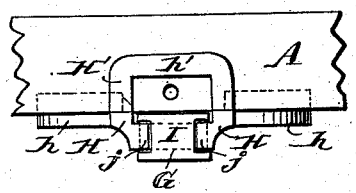
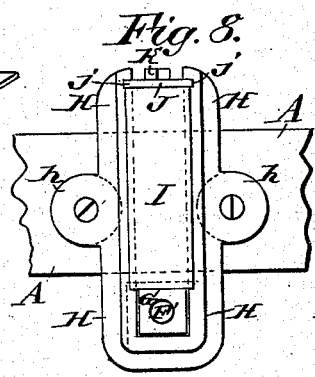
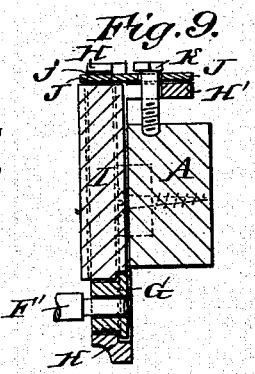
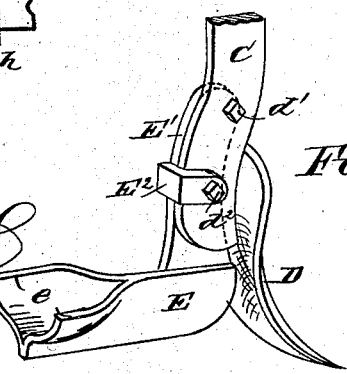
WITNESSES:
Peter Beyer
C. Sedgwick
INVENTOR:
J. Laude
BY Munn & Co.
ATTORNEYS.
N. PETERS. Photo-Lithographer, Washington, D. C.

UNITED STATES PATENT OFFICE.

JOSEPH LAUDF, OF MONTICELLO, ARKANSAS.

SEED-PLANTER.

SPECIFICATION forming part of Letters Patent No. 325,844, dated September 8, 1885.

Application filed January 2, 1885. (No model.)

*To all whom it may concern:*

Be it known that I, JOSEPH LAUDE, of Monticello, in the county of Drew and State of Arkansas, have invented a new and Improved Seed-Planter, of which the following is a full, clear, and exact description.

The object of my invention is to improve the construction of seed-planters, especially the planter shown in a United States Letters Patent No. 204,983, issued to me on the 18th of June, 1878, so as to make a cleaner furrow and a better ridging of the earth on the dropped seed, and to provide for planting two or more kinds of seed at once and at any desired distances apart, and for dropping seed and a fertilizer simultaneously.

The invention consists in various constructions and combinations of parts of the planter, all as hereinafter fully described and claimed.

Reference is to be had to the accompanying drawings, forming part of this specification, in which similar letters of reference indicate corresponding parts in all the figures.

Figure 1:
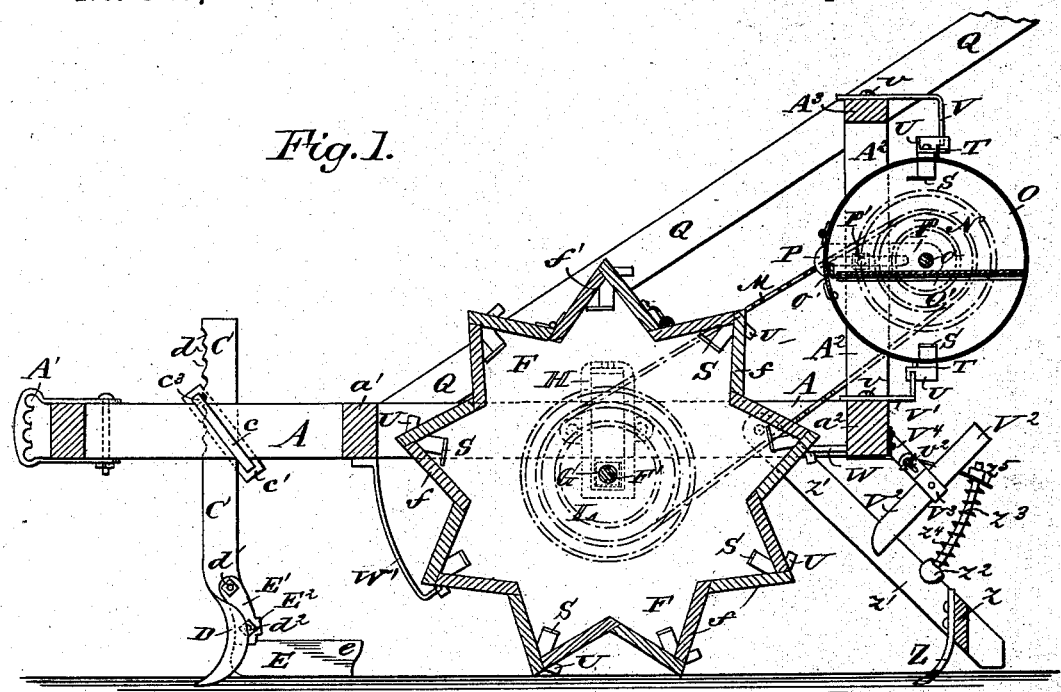
Figure 2:
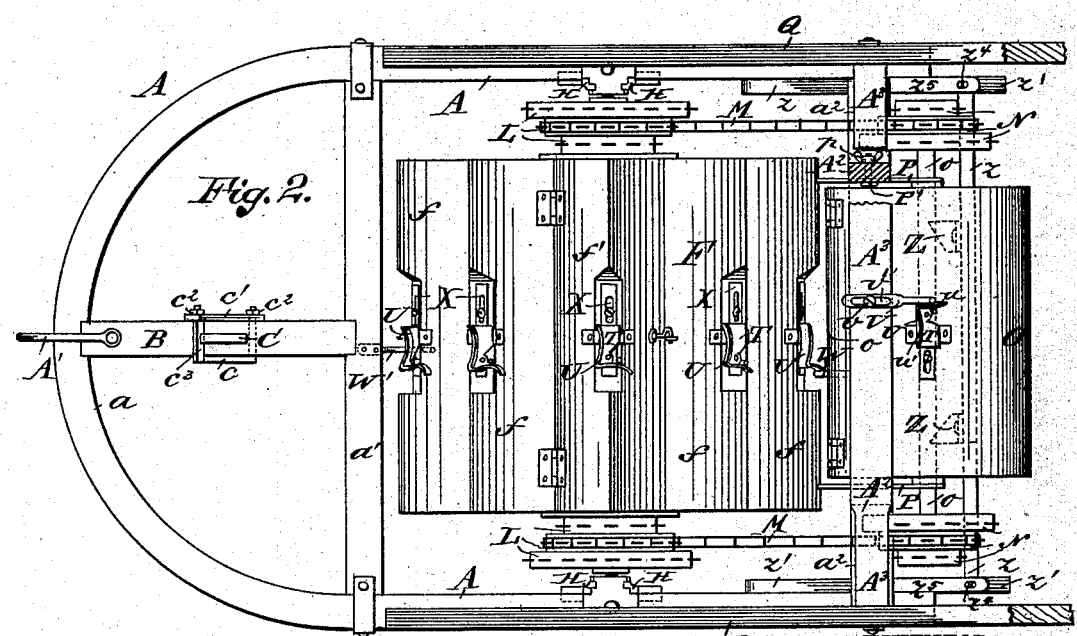

Figure 1 is a longitudinal sectional elevation of my improved seed-planter. Fig. 2 is a plan view thereof, partly broken away and in section. Fig. 3 is an enlarged detail plan view of the seed-dropping devices. Fig. 4 is a sectional elevation taken on the line $x\ x$, Fig. 3. Figs. 5 and 6 are perspective views of different styles of seed-gages. Fig. 7 is a perspective view of the seed-dropping plates. Figs. 8, 9, 10, and 11 are detail views showing the arrangement of the end bearings of the main seed or fertilizer dropping wheel or drum; and Fig. 12 is a rear perspective view of the furrow-opener and drag.

The letter A indicates the machine-frame, which has a bowed front, $a$, and cross-bars $a'$ $a^2$, and between the bar $a'$ and front $a$ is fixed a longitudinally-ranging beam, B, through which the standard C of the furrow-opening plow D is passed, and to which beam the standard is firmly locked by a diagonally-ranging yoke, $c$, extending along one side and the upper and lower edges of the beam and passing through a plate, $c'$, outside of which nuts $c^2$ are run on the threaded ends of the yoke $c$, whose upper and lower arms lie, respectively, at the front and rear edges of the standard C, and the upper arm, $c^3$, of the yoke may enter any one of a series of notches, $d$, formed in the front edge of the standard, so that the plow D and its drag E may be supported at any desired height to work deeper or shallower in the ground. I connect the drag E to the plow D, so that it lines with the longitudinal center of the plow, by means of a pivot-bolt, $d'$, passing through the upper arm, E', of the drag and the plow-standard C, and the arm E' has fixed to it the angle-bracket E², which locks by its hook over the side of the standard C opposite to that against which the arm E' lies, so that lateral play of the drag is prevented, and a bolt, $d^2$, passed through the parts C E' E² binds the drag firmly to place. If at any time the drag E is not needed, as in planting some crops, the bolt $d^2$ may be taken out and the drag be swung up on the pivot-bolt $d'$, or both bolts may be removed for separating the drag from the standard.

The drag has formed at its opposite sides the diverging plates or wings $e\ e$, which pack and smooth the sides of the furrow opened by the plow D, and insure the dropping of the seed to the bottom of the furrow and at a uniform depth in the soil; and I make the width of the drag across the wings $e\ e$ wider at the ground-surface than the plow D, so that the drag serves to gage the depth of the furrow to some extent, the draft-connection being of course placed in the proper notch of the clevis A', fixed to the front of the frame.

The seed or fertilizer holding drum F has closed ends and a periphery formed in a series of projecting angles, $f$, one of which, as at $f'$, is hinged to allow the seed or fertilizer to be placed in the drum, which as it rolls over the ground also acts as a clod-crusher when the drum is used to plant cotton-seed in lumpy soil, at which time free vertical play bodily of the drum is desirable, and to secure which I journal the ends of the shaft F' of the drum in boxes G, which are fitted to slide in vertically-slotted yoke-plates H, fixed to the opposite side bars of the frame A—say by screws passed through lugs $h$ of the plates into the frame—and when the drum is not to have vertical movement, as when planting certain seeds on smoother ground, I pass into the vertical slots of the plates H, and above the bearings or boxes G, the blocks I, over which the slide plates or caps J are passed into slots $j$, made in horizontal plane in the inner faces of the opposite arms or sides of the plates H, near their upper ends, and so that said caps J lie upon inturned flanges H' of the plates, and pins or screws K may be passed through the cap J into the flanges H' or inside of outer bars h' of the flanges into the frame A to hold the caps to place (see Figs. 8, 9, 10, and 11) and secure the shaft-boxes G at the bases of the slots in the yoke-plates.

To the shaft F' of the drum F are fixed the cone chain-pulleys L, from which driving-chains M lead to cone chain-pulleys N, fixed to the shaft of the upper seed cylinder or drum, O, the shaft o of which is supported at the ends in bearings in plates P, which are held to posts $A^2 A^2$, rising from the frame A, by bolts P', passing through slots in the plates P, and having thumb-nuts p by which to bind the plates to the posts.

The slotted plates P allow the shaft o of the seed-drum O to be adjusted to or from the shaft F' of the drum F, so that the chains M may always be kept taut on their pulleys L N, when the chains are adjusted thereon to give varying speeds to the drums F and O, for dropping the seeds at different distances apart by devices presently to be described. By shifting the chains on the cone-pulleys, the distance apart at which the seeds will be planted may be varied from twelve inches to five feet by increasing distances of six inches or more, so that the machine is adapted for planting many kinds of seed.

The frame posts $A^2 A^2$ are tied together by a cross bar or beam, $A^3$, which also ties the opposite handles, Q Q, together, the handles being fastened at their forward ends to the frame A and extending backward a suitable distance to be reached by the attendant for guiding the machine when at work.

I make the upper rear seed-drum, O, with a central lengthwise partition, O', so that two kinds of seed may be planted from the drum and in alternate hills, and I prefer to make the partition O' removable by fitting it into slide-ways fixed to the ends of the drum, as shown, so it may be used or not, as desired. Part of the periphery of the drum O is hinged, as at o', to allow the seeds to be placed in it.

I provide the drum F at the center of its peripheral angles, and also the drum O at two, or it may be four, diametrically-opposite points of its periphery, with a casing or throat piece, R, having outer flanges, r, by which they are secured within openings of the drums, and to form pockets into which the seed is admitted, and from which it is discharged by the double action of the valve-plates S T, which are connected rigidly by a pin, t, by which, also, both plates are pivoted to the drums, and when the seed-pockets R are deep, as in Fig. 4, a flange, r', may project from the inner edge of the pocket through which and the seed-drum periphery the pivot-pin t passes to give sufficient length of bearings or between the bearings to hold the valve-plates S T closely to the inner and outer end openings of the seed-pockets. Shoulders $t' t^2$ in the plate T strike alternately against a stop pin, $t^3$, fixed to the drum to limit the swinging of the valve-plates both ways.

The outer plates, T, have flanges U, the arms u u' of which are set at about right angles with each other and are slightly curved, so that the flanges U of the valve-plates of the upper drum, O, will by their arms u strike the tappet-arm V, held to the cross-bar $A^3$, to swing the plate S over to uncover the inner end of the seed-pocket, and at the same time cover its outer end by the plate T, so that the pocket may fill with seed as the drum turns downward, and the arm u' of flange U next meets the lower tappet-arm, V', which swings the plates S T back to cut off the supply to the seed-pocket and drop the seed that had filled into it, and no more, to the ground through a spout, $V^2$, held to the frame by means of a clip or yoke, $V^3$, which is attached to a bracket, $V^4$, fixed to the frame A by a thumb-screw, $v^2$, which passes through slots in the side arms of yoke $V^3$, thereby allowing the spout to be set nearer to or farther from the drum O, and at different angles, so as to drop the seed in a bunch or scattered, as may desired.

I hold the tappet-arms V V' to the machine-frame by screws v, passing through slots v' of the tappets, so that the tappets may be adjusted to operate the valve-plates S T at any position to which the drum O may be adjusted to vary the distance apart of the planting, as above described.

Tappet-arms W W', held to the frame, operate the valve or cut-off plates S T of the drum F, to drop seed or fertilizer therefrom into the furrow, substantially as above described.

In my aforesaid Patent, No. 204,983, the valve-plates were pivoted to the gages which were used to regulate the sizes of the seed-pockets. In my present invention I keep the gages X separate from the valve-plates by connecting them by screws x, passing through slots x' in the gages to the seed-drums at points opposite to the pivots of the slide-plates, (see Figs. 3 and 4,) so that the end flanges, X', of the gages may be shifted to govern the size of the seed-pocket as desired, and by making the pockets R and end gaging-flanges X' more or or less deep and regulating the length of the connecting-pin t of the slide-plates S T, it will be seen that any desired quantity of seed may be dropped from the seed-drums.

For the deeper seed-pockets R, I prefer to form inside flanges, $X^2$, on the gages X, by bending the metal over backward or at a right angle from the inner end, X', of the gage-flanges, (see Fig. 4,) which holds the gages better to the seed-pockets R in connection with the screw x.

When smaller quantities of seed are to be dropped, the combined seed pockets and gages Y, shown in Fig. 6, may be used with the plates S T by fastening them by a screw passed through a hole, y, into the drums, so that their opposite end portion, having seed-pockets $Y^2$ of any desired size, may pass into an opening in the periphery of the drum, as will readily be understood.

To cover the seed in the furrow I employ the right and left hand coverer hoes or blades Z Z, which are fixed to a cross-bar, $z$, connected pivotally by arms $z'$ $z'$ to the side bars of the machine-frame, and the arms $z'$ are provided with clips $z^2$, having bent rods $z^3$, on which springs $z^4$ are placed beneath bars or plates $z^5$, attached to the frame, and through which the rods $z^3$ freely pass, so that the springs shall hold the coverers down to their work and cause them to ridge the earth evenly over the seed.

At times I may fix the arms $z'$ $z'$ of the coverer-hoe frame rigidly to the machine-frame and dispense with the parts $z^2$ $z^3$ $z^4$ $z^5$, so that the coverers will not have an independent up-and-down movement.

It will be seen that by taking out the two screws P' the upper drum, O, may be removed from the frame when it is desired to use the lower drum, F, alone, and when both drums are used seed may be dropped from either drum while a fertilizer is dropped from the other one.

Having thus described my invention, what I claim as new, and desire to secure by Letters Patent, is—

1. The combination, with the furrow-opener, of the drag held to the rear side of the opener, and having upwardly-diverging wings extended laterally beyond the sides of the furrow-opener, whereby the running depth of the latter may be gaged, substantially as set forth.

2. In a seed-planter, the combination, with the furrow-opening plow and its standard, of the drag E, constructed with diverging wings $e$ $e$, and an arm, E', pivoted to the standard at $d'$, and having the angle hook-plate $E^2$, engaging the standard, and the bolt $d^2$, substantially as herein set forth.

3. As an improved article of manufacture, the drag E, made with a horizontally-ranging bottom part provided with diverging wings $e$ $e$, and an arm, E', having a hook-shaped angle-plate, $E^2$, substantially as herein set forth.

4. In a seed-planter, the combination, with the seed-drum F, its shaft F', and the machine-frame, of the yoke-plates H, loose boxes G, the removable blocks I, and caps J, substantially as herein set forth.

5. The combination of a lower seed-drum having cone-pulleys, a second drum journaled adjacent to said lower seed-drum, and also provided with cone-pulleys, an adjustable support for one of said drums, whereby they may be adjusted toward each other and apart, and belts connecting the pulleys of said drums, substantially as set forth.

6. The drum O, provided on the inner sides of its opposite ends with approximately-radial guideways, combined with a partition, O', extended longitudinally of the drum O, and having its ends removably held within guideways thereof, substantially as set forth.

7. The combination, with the seed-drum O, of the partition O', extended longitudinally thereof, substantially as herein set forth.

8. In a seed-planter, the combination, with the seed-pockets R and pivoted valve-plates S T, of separate gage-plates X, held adjustably to the seed-drum and entering the pockets by their flanges X', substantially as herein set forth.

9. In a seed-planter, the combination, with the seed-pockets R, of the gage-plates X, held adjustably to the seed-drum, and provided with the gaging-flanges X' and inner flanges, $X^2$, substantially as herein set forth.

10. In a seed-planter, the combination, with the seed drum O and its seed-dropping devices, of the spout $V^2$, held to the frame-bracket $V^4$ by a clip or yoke, $V^3$, having slots in its side arms, and a screw, $v^2$, substantially as herein set forth.

11. The combination, with the movable seed-drum O and its seed-dropping valve-plates S T U, of the adjustable tappets V V', substantially as herein set forth.

JOSEPH LAUDE.

Witnesses:
W. C. GALLION,
ZEPH J. WOOD.